(12) United States Patent
Liu et al.

(10) Patent No.: US 12,737,364 B2
(45) Date of Patent: Sep. 15, 2026

(54) KEY-VALUE CACHE MANAGEMENT SYSTEM FOR INFERENCE PROCESSES

(71) Applicants: Bytedance Technology Ltd., Grand Cayman (KY); Beijing Zitiao Network Technology Co., Ltd., Beijing (CN)

(72) Inventors: Tongping Liu, Los Angeles, CA (US); Chak-Pong Chung, Los Angeles, CA (US); Liguang Xie, Los Angeles, CA (US); Jianjun Chen, Los Angeles, CA (US); Caixue Lin, Los Angeles, CA (US); Wu Xiang, Beijing (CN); Rui Shi, Beijing (CN)

(73) Assignees: Bytedance Technology Ltd., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/091,623

(22) Filed: Mar. 26, 2025

(65) Prior Publication Data

US 2025/0225134 A1 Jul. 10, 2025

(51) Int. Cl.
*G06F 16/24* (2019.01)
*G06F 12/02* (2006.01)
*G06F 16/2455* (2019.01)

(52) U.S. Cl.
CPC .... *G06F 16/24552* (2019.01); *G06F 12/0246* (2013.01)

(58) Field of Classification Search
CPC ...................... G06F 16/24552; G06F 12/0246
See application file for complete search history.

(56) References Cited

U.S. PATENT DOCUMENTS

| | | | | |
|---|---|---|---|---|
| 10,572,452 | B1 * | 2/2020 | Singh | G06F 16/2246 |
| 11,861,222 | B2 * | 1/2024 | Basu | G06F 3/0653 |
| 12,046,028 | B1 * | 7/2024 | Wu | G06V 10/955 |
| 2011/0313973 | A1 * | 12/2011 | Srivas | G06F 16/275 707/634 |
| 2013/0275656 | A1 * | 10/2013 | Talagala | G06F 12/0246 711/103 |
| 2021/0141736 | A1 * | 5/2021 | Manzanares | G06F 12/1009 |

(Continued)

OTHER PUBLICATIONS

Kwon, W. et al., "Efficient Memory Management for Large Language Model Serving with PagedAttention," Symposium on Operating Systems Principles, Oct. 23, 2023, Koblenz, Germany, 16 pages.

(Continued)

*Primary Examiner* — Eliyah S. Harper
(74) *Attorney, Agent, or Firm* — Alleman Hall LLP

(57) ABSTRACT

A key-value cache management system processes inference requests of a generative model. An inference request requests a starting virtual memory address and a number of layers in the generative model. In response to receiving an inference request, contiguous virtual memory space is reserved for the key-value cache in accordance with the inference request by assigning the starting virtual memory address in the key-value cache and calculating memory pointers for each layer in the model and each block so that the one or more blocks are written sequentially. The generated memory pointers are outputted to the generative model so that each self-attention layer writes computed key-value pairs at physical addresses in the key-value cache specified by the memory pointers.

20 Claims, 6 Drawing Sheets

(56) References Cited

U.S. PATENT DOCUMENTS

| | | | | |
|---|---|---|---|---|
| 2022/0075782 | A1* | 3/2022 | Hines | G06F 16/211 |
| 2024/0320146 | A1* | 9/2024 | Karr | G06F 9/45558 |
| 2024/0345961 | A1* | 10/2024 | Kuyel | G06F 12/0882 |
| 2025/0045122 | A1* | 2/2025 | Chuang | G06F 9/5066 |
| 2025/0061316 | A1* | 2/2025 | Gobriel | G06N 3/045 |

OTHER PUBLICATIONS

Prabhu, R. et al., "vAttention: Dynamic Memory Management for Serving LLMs without PagedAttention," ACM International Conference on Architectural Support for Programming Languages and Operating Systems, Mar. 30, 2025, Rotterdam, Netherlands, 18 pages.

* cited by examiner

Figure 2:
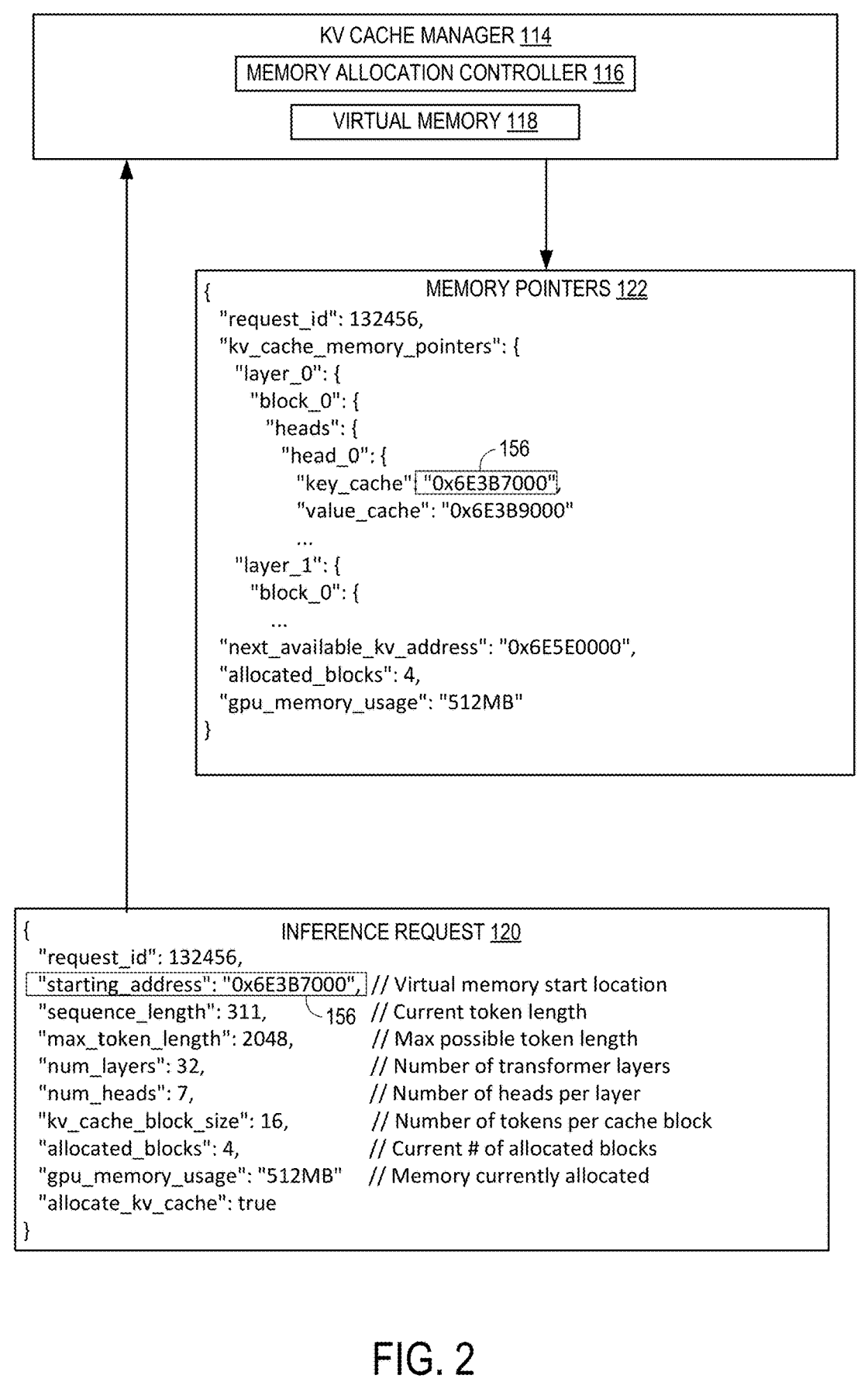

KV CACHE MANAGER 114

MEMORY ALLOCATION CONTROLLER 116

VIRTUAL MEMORY 118

MEMORY POINTERS 122

{
  "request_id": 132456,
  "kv_cache_memory_pointers": {
    "layer_0": {
      "block_0": {
        "heads": {
          "head_0": {
            "key_cache": "0x6E3B7000",
            "value_cache": "0x6E3B9000"
            ...
    "layer_1": {
      "block_0": {
        ...
  "next_available_kv_address": "0x6E5E0000",
  "allocated_blocks": 4,
  "gpu_memory_usage": "512MB"
}

156

INFERENCE REQUEST 120

{
  "request_id": 132456,
  "starting_address": "0x6E3B7000", // Virtual memory start location
  "sequence_length": 311, // Current token length
  "max_token_length": 2048, // Max possible token length
  "num_layers": 32, // Number of transformer layers
  "num_heads": 7, // Number of heads per layer
  "kv_cache_block_size": 16, // Number of tokens per cache block
  "allocated_blocks": 4, // Current # of allocated blocks
  "gpu_memory_usage": "512MB" // Memory currently allocated
  "allocate_kv_cache": true
}

BLOCK 0

142 KEY CACHE

| | HEAD 0 | | | | HEAD 1 | | | |
|---|---|---|---|---|---|---|---|---|
| LAYER_0 | FOUR | SCORE | AND | SEVEN | FOUR | SCORE | AND | SEVEN |
| LAYER_1 | FOUR | SCORE | AND | SEVEN | FOUR | SCORE | AND | SEVEN |
| ... | FOUR | SCORE | AND | SEVEN | FOUR | SCORE | AND | SEVEN |
| LAYER_m | FOUR | SCORE | AND | SEVEN | FOUR | SCORE | AND | SEVEN |

144 VALUE CACHE

| | HEAD 0 | | | | HEAD 1 | | | |
|---|---|---|---|---|---|---|---|---|
| LAYER_0 | FOUR | SCORE | AND | SEVEN | FOUR | SCORE | AND | SEVEN |
| LAYER_1 | FOUR | SCORE | AND | SEVEN | FOUR | SCORE | AND | SEVEN |
| ... | FOUR | SCORE | AND | SEVEN | FOUR | SCORE | AND | SEVEN |
| LAYER_m | FOUR | SCORE | AND | SEVEN | FOUR | SCORE | AND | SEVEN |

BLOCK 1

142 KEY CACHE

| | HEAD 0 | | | | HEAD 1 | | | |
|---|---|---|---|---|---|---|---|---|
| LAYER_0 | YEARS | AGO | OUR | FATHERS | YEARS | AGO | OUR | FATHERS |
| LAYER_1 | YEARS | AGO | OUR | FATHERS | YEARS | AGO | OUR | FATHERS |
| ... | YEARS | AGO | OUR | FATHERS | YEARS | AGO | OUR | FATHERS |
| LAYER_m | YEARS | AGO | OUR | FATHERS | YEARS | AGO | OUR | FATHERS |

144 VALUE CACHE

| | HEAD 0 | | | | HEAD 1 | | | |
|---|---|---|---|---|---|---|---|---|
| LAYER_0 | YEARS | AGO | OUR | FATHERS | YEARS | AGO | OUR | FATHERS |
| LAYER_1 | YEARS | AGO | OUR | FATHERS | YEARS | AGO | OUR | FATHERS |
| ... | YEARS | AGO | OUR | FATHERS | YEARS | AGO | OUR | FATHERS |
| LAYER_m | YEARS | AGO | OUR | FATHERS | YEARS | AGO | OUR | FATHERS |

... HEAD n

RECEIVE INFERENCE REQUEST TO WRITE ONE OR MORE BLOCKS OF K-V PAIRS TO K-V CACHE, THE REQUEST INCLUDING A STARTING VIRTUAL MEMORY ADDRESS AND A NUMBER OF LAYERS IN THE GENERATIVE MODEL 202

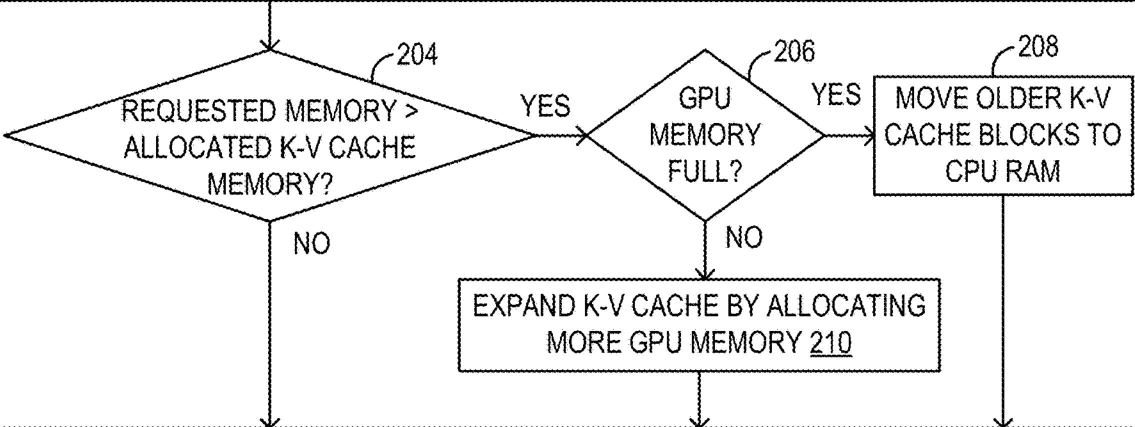

RESERVE CONTIGUOUS VIRTUAL MEMORY SPACE FOR K-V CACHE IN ACCORDANCE WITH INFERENCE REQUEST 212

ASSIGN A STARTING VIRTUAL MEMORY ADDRESS IN THE K-V CACHE 214

CALCULATE MEMORY POINTERS FOR EACH LAYER IN THE MODEL AND EACH BLOCK USING: BLOCK ADDRESS = STARTING ADDRESS + (BLOCK INDEX X BLOCK SIZE), THEREBY ENSURING THE BLOCKS ARE WRITTEN SEQUENTIALLY 216

218

OUTPUT THE MEMORY POINTERS TO THE GENERATIVE MODEL, THEREBY CAUSING EACH SELF-ATTENTION LAYER OF THE GENERATIVE MODEL TO WRITE COMPUTED K-V PAIRS AT PHYSICAL ADDRESSES SPECIFIED BY THE MEMORY POINTERS

220

RESPONSIVE TO DETECTING THAT THE INFERENCE REQUEST IS FINISHED, UNMAP PHYSICAL MEMORY ASSOCIATED WITH THE INFERENCE REQUEST IN THE K-V CACHE

THROUGHPUT IMPROVEMENTS USING FIRST GPU HARDWARE

| Model Parameters | Sequence Length | Throughput [GB/s] (Baseline) | Throughput [GB/s] (Implemented System) | Improvement (%) |
|---|---|---|---|---|
| Layers=32, Dimensions=4096 | 4096 | 6431 | 10833 | 68.4 |
| Layers=32, Dimensions=4096 | 8192 | 6499 | 10999 | 69.2 |
| Layers=80, Dimensions=8192 | 4096 | 8141 | 10855 | 33.3 |
| Layers=80, Dimensions=8192 | 8192 | 8128 | 10564 | 30.0 |

400

THROUGHPUT IMPROVEMENTS USING SECOND GPU HARDWARE

| Model Parameters | Sequence Length | Throughput [GB/s] (Baseline) | Throughput [GB/s] (Implemented System) | Improvement (%) |
|---|---|---|---|---|
| Layers=32, Dimensions=4096 | 4096 | 8403 | 23706 | 182.1 |
| Layers=32, Dimensions=4096 | 8192 | 8131 | 23350 | 187.2 |
| Layers=80, Dimensions=8192 | 4096 | 12173 | 22986 | 88.8 |
| Layers=80, Dimensions=8192 | 8192 | 11737 | 22997 | 95.9 |

FIG. 5

KEY-VALUE CACHE MANAGEMENT SYSTEM FOR INFERENCE PROCESSES

BACKGROUND

Auto-regressive models generate tokens sequentially, one token at a time, generating each token based on all the tokens that have come before it. As each token is generated, the attention over all previously generated tokens is computed. This sequential dependency means that, for each new token, the model considers the entire history of previously generated tokens.

Conventionally, key-value (key-value) caches are employed to store previously computed keys and values, so that keys and values are not recomputed from scratch every time a new token is generated, thereby saving computational resources. However, conventional key-value cache systems are inefficient and wasteful with memory utilization, which often leads to memory shortages even when using high-end hardware. With successive generations of large language models supporting increasingly large inference requests, the capacities of key-value caches can be quickly exhausted. Existing key-value cache management approaches utilize block tables, which adds runtime overhead as well as software complexity.

SUMMARY

In view of the above issues, a key-value cache management system is provided for inference processes. The management system comprises processing circuitry and memory storing instructions. When executed, the instructions cause the processing circuitry to receive the inference request to write one or more blocks of key-value pairs to a key-value cache. The inference request includes a starting virtual memory address and a number of layers in the generative model. The management system reserves contiguous virtual memory space for the key-value cache in accordance with the inference request by assigning the starting virtual memory address in the key-value cache and calculating memory pointers for each layer in the generative model and each block so that the one or more blocks are written sequentially. The system then outputs the generated memory pointers to the generative model, thereby causing each self-attention layer of the generative model to write computed key-value pairs at physical addresses in the key-value cache specified by the memory pointers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 illustrates a schematic view of the inference request and memory pointers in the example of FIG. 1.

FIG. 3 illustrates a detailed schematic view of the key-value cache of the computing system of FIG. 1.

FIG. 4 is a flowchart of a key-value cache management method for processing an inference request of a generative model according to an example embodiment of the present disclosure.

FIG. 5 shows two tables illustrating experimental data comparing the throughput performance of an inference process of a generative with and without the implementation of the key-value cache manager of the present disclosure across different hardware configurations.

DETAILED DESCRIPTION

Figure 1:
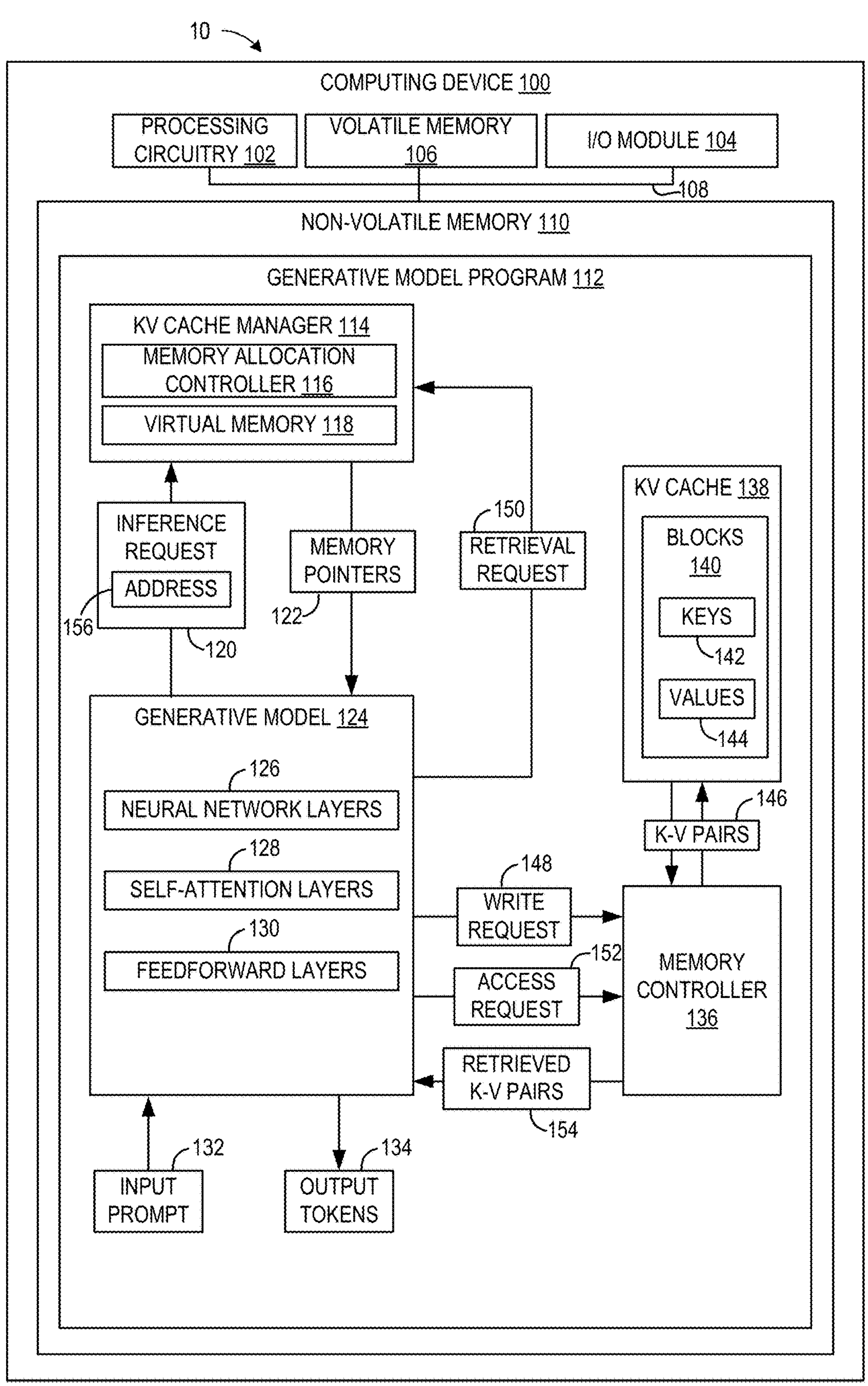
FIG. 1 illustrates a schematic view of a computing system according to an example of the present disclosure.

Referring to FIG. 1, a key-value cache management computing system 10 is provided for processing inference requests 120 of a generative model 124. The computing system 10 comprises a computing device 100 including processing circuitry 102, an input/output module 104, volatile memory 106, and non-volatile memory 110 storing a generative model program 112. A bus 108 may operatively couple the processing circuitry 102, the input/output module 104, and the volatile memory 106 to the non-volatile memory 110. Although the generative model program 112 is depicted as hosted at one computing device 100, it will be appreciated that the generative model program 112 may alternatively be hosted across a plurality of computing devices to which the computing device 100 may be communicatively coupled via a network.

The processing circuitry 102 is configured to store the generative model program 112 in non-volatile memory 110 that retains instructions stored data even in the absence of externally applied power, such as FLASH memory, a hard disk, read only memory (ROM), electrically erasable programmable memory (EEPROM), etc. The instructions include one or more programs, including the generative model program 112, and data used by such programs sufficient to perform the operations described herein. In response to execution by the processing circuitry 102, the instructions cause the processing circuitry 102 to execute the generative model program 112.

The processing circuitry 102 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. Volatile memory 106 can include physical devices such as random-access memory (RAM), static random-access memory (SRAM), dynamic random-access memory (DRAM), etc., which temporarily stores data only for so long as power is applied during execution of programs. Non-volatile memory 110 can include physical devices that are removable and/or built in, such as optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology.

The generative model 124 has a transformer-based architecture with neural network layers 126, self-attention layers 128 configured to calculate attention weights and retrieve token dependencies, and feedforward layers 130 configured to apply non-linear transformations to refine token embeddings.

When a user prompts the generative model 124 to generate text and output tokens 134, an input prompt 132 is inputted into the generative model 124. Responsive to receiving input of the input prompt 132, the inference process is initialized, which causes the generative model 124 to generate an inference request 120 to write one or more blocks 140 of key-value pairs 146 to a key-value cache 138. The inference request 120 includes at least a starting virtual memory address 156, a token length for the input prompt 132, and a number of layers in the generative model 124 which generated the inference request 120.

During the inference process, the key-value cache 138 stores the intermediate results (keys 142 and values 144) of the self-attention layers 128 for past tokens, so that the generative model 124 computes attention for the new token instead of over all previous tokens.

The key-value cache manager 114 receives the inference request 120 and generates and outputs virtual memory pointers 122 to the generative model 124. Using the virtual memory pointers 122, the generative model 124 writes key-value pairs 146 to the key-value cache 138 by sending a write request 148 to the memory controller 136. Responsive to receiving the write request 148, the memory controller 136 generates a physical memory address corresponding to the virtual memory address in the write request 148, and then writes the key-value pairs 146 into the physical memory locations in the key-value cache 138 indicated by the virtual memory pointers 122. These physical memory locations are organized by blocks 140 configured to store keys 142 and values 144.

Turning to FIG. 2, examples of the inference request 120 generated by the generative model 124 and the memory pointers 122 generated by the key-value cache manager 114 are depicted in detail. The inference request 120 includes a request ID and a starting virtual memory address 156, "0x6E3B7000". Instead of using a block table to determine assignments for each token, the key-value cache manager 114 computes subsequent block placements directly from this starting virtual memory address 156. The inference request 120 also includes a sequence length, or the number of tokens to be processed. In this example, the sequence length is 311. The inference request 120 also specifies the number of transformer layers in the generative model 124. The inference request 120 may also indicate a number of attention heads per layer, a number of tokens per cache block, a current number of allocated blocks, and an amount of physical GPU memory currently allocated.

It will be appreciated that the term 'physical GPU memory' is not intended to be limited strictly to the memory of graphical processing units. Rather, it will be understood that the term 'physical GPU memory' refers to any memory capable of being used to execute inference processes for generative models. Such memory is not particularly limited, and may include memory of tensor processing units (TPUs), field-programmable gate arrays (FPGAs), application-specific integrated circuits (ASICs), neural processing units (NPUs), central processing units (CPUs) optimized for parallel computation, digital signal processors (DSPs), and any combination thereof.

Returning to FIG. 1, responsive to receiving the inference request 120, the memory allocation controller 116 of the key-value cache manager 114 reserves contiguous virtual memory space for the key-value cache 138 in the virtual memory 118 in accordance with the inference request 120. A starting virtual memory address 156 in the key-value cache 138 is assigned, and then memory pointers 122 are calculated for each layer and token position of each block, so that the blocks are written contiguously and sequentially. Each block address may be calculated using the formula: block address=starting address+(block index×block size). Accordingly, each block address is calculated directly from the starting virtual memory address 156. It will be noted that the calculation of each block address does not involve a block table which maps virtual blocks to physical blocks.

However, depending on the size of the memory requested by the inference request 120 and the status of the physical GPU memory, the key-value cache manager 114 may move older key-value cache blocks to CPU RAM, or allocate more physical GPU memory. When the memory allocation controller 116 determines that the memory requested by the inference request 120 exceeds the allocated memory of the key-value cache, then the memory allocation controller 116 may expand the key-value cache 138 by allocating more physical GPU memory. When the memory allocation controller 116 determines that the physical GPU memory is full, the memory allocation controller 116 may move older key-value cache blocks to CPU RAM.

The key-value cache manager 114 outputs memory pointers 122 to the generative model 124, thereby causing each self-attention layer 128 of the generative model 124 to write computed key-value pairs 146 at physical addresses specified by the memory pointers 122. Virtual memory addresses are assigned by the memory pointers 122 in the contiguous virtual memory space reserved for the inference request 120. As shown in the example of FIG. 2, the memory pointers 122 indicate that head 0 of block 0 of layer 0 is assigned to the keys and values calculated for the first tokens of the inference request 120. The key cache is assigned the starting virtual memory address 156 of "0x6E3B7000" and the value cache is assigned a virtual memory address of "0x6E3B9000". Although the depiction of the memory pointers 122 are abbreviated in FIG. 2, it will be appreciated that the keys and values for the tokens are assigned virtual memory addresses for the key caches and value caches, respectively, for each block and layer in the key-value cache.

Turning to FIG. 3, the structure of the key-value cache 138 of FIG. 1 is illustrated in detail in one example. The key-value pairs 146 are stored in reserved blocks 140 of the key-value cache 138 as keys 142 and values 144 in key caches and value caches, respectively. Each block 140 in the key-value cache 138 comprises a key cache configured to store keys 142 of the key-value pairs 146 and a value cache configured to store corresponding values 144 of the key-value pairs 146. The reserved blocks 140 of the key-value cache 138 correspond to the contiguous virtual memory space reserved by the key-value cache manager 114. The key caches are configured to store transformed token embeddings, while the value caches store the layer-specific contextualized representations of the tokens.

Keys 142 and values 144 of the computed key-value pairs 146 are stored in a sequential and contiguous manner in contiguous layers and blocks from the starting virtual memory address 156 in the key-value cache 138. The contiguous layers and blocks may also include contiguous attention heads. For example, for each attention head from head 0 to head n of the generative model 124, the keys 142 for the first four tokens ('four', 'score', 'and', 'seven') of the input prompt 132 of the inference request 120 are stored in layers 0 through m of the key caches of Block 0, and the values 144 for the first four tokens of the input prompt of the inference request 120 are stored in layers 0 through m of the value caches of Block 0. Accordingly, all the layers of Block 0 may store keys and values processed from the same sequence of tokens. In other words, for a given block, each layer contains keys or values calculated from a sequence of tokens corresponding to the given block. As shown in FIG.

3, a first sequence of tokens 'four', 'score', 'and', 'seven' corresponds to block 0, and a second sequence of tokens 'years', 'ago', 'our', 'fathers' corresponds to block 1.

Similarly, the keys 142 of the next four tokens ('years', 'ago', 'our', 'fathers') of the input prompt 132 of the inference request 120 are stored in layers 0 through m of the key caches of Block 1, and the corresponding values 144 are stored in layers 0 through m of the value caches of Block 1. Accordingly, the key-value cache 138 can store transformed representations of past tokens. Keys 142 and values 144 corresponding to subsequent tokens are similarly stored in a sequential and contiguous manner, thereby avoiding data fragmentation. Since the keys 142 and corresponding values 144 are stored in contiguous layers and blocks from the starting virtual memory address 156, the key-value cache manager 114 can compute the placement of each block simply based on the starting virtual memory address 156 indicated in the inference request 120. This facilitates the allocation of physical GPU memory on demand, as well as the deallocation of the physical GPU memory allocated to the inference request 120 upon completion. Responsive to detecting that the inference request 120 is finished, the key-value cache manager 114 unmaps the physical GPU memory associated with the inference request 120 in the key-value cache 138. Since the virtual memory was allocated contiguously and sequentially, the key-value cache manager 114 may easily compute the range of memory to free simply based on the starting virtual memory address 156 and token length indicated by the inference request 120. Accordingly, physical GPU memory may be allocated only when prompted by the inference request 120, and released immediately as each inference request 120 completes. The released or unmapped physical GPU memory may be added to a memory pool for reuse or reallocation to store other key-value pairs 146 in the same inference request 120 or store key-value pairs in another inference request.

Returning to FIG. 1, the generative model also generates a retrieval request 150 during an active inference process to retrieve stored key-value pairs 146 to compute self-attention for the next token. Responsive to receiving the retrieval request 150 from the generative model 124, the memory allocation controller 116 of the key-value cache manager 114 generates memory pointers 122 corresponding to the requested tokens corresponding to the stored key-value pairs 146 indicated in the retrieval request 150. Responsive to receiving the memory pointers 122, the generative model 124 generates and sends an access request 152 to the memory controller 136 requesting to retrieve the key-value pairs 146 from the key-value cache 138. Responsive to receiving the access request 152 from the generative model 124, the memory controller 136 translates the virtual memory addresses in the access request 152 into physical memory addresses in the physical GPU memory, and retrieves the stored key-value pairs 146 or cached values from the key-value cache 138. The memory controller 136 sends the retrieved key-value pairs 154 back to the generative model 124, thereby enabling the generative model 124 to compute self-attention for the next token in the inference process.

FIG. 4 shows a process flow diagram of an example method 200 for processing inference requests 120 for a generative model 124. The example method 200 may be executed by the processing circuitry and memory of the computing system 10 of FIG. 1. The example method 200 includes, at step 202, receiving an inference request to write one or more blocks of key-value pairs to a key-value cache, the inference request including a starting virtual memory address and a number of layers in the generative model. At step 204, it is determined whether the memory requested by the inference request exceeds the allocated memory of the key-value cache. When it is determined at step 204 that the memory requested by the inference request does not exceed the allocated memory of the key-value cache, the method 200 proceeds to step 212 to reserve a contiguous virtual memory space for the key-value cache in accordance with the inference request.

When it is determined at step 204 that the memory requested by the inference request exceeds the allocated memory of the key-value cache, the method 200 proceeds to step 206 to determine whether the physical GPU memory is full or at maximum capacity. When it is determined at step 206 that the physical GPU memory is full, the method 200 proceeds to step 208 to move older key-value cache blocks to the CPU RAM, and then proceeds to step 212 to reserve contiguous virtual memory space in accordance with the inference request. When it is determined at step 206 that the physical GPU memory is not full, the method 200 proceeds to step 210 to expand the key-value cache by allocating more physical GPU memory, and then proceeds to step 212 to reserve contiguous virtual memory space in accordance with the inference request.

Step 212 may be executed to reserve contiguous virtual memory space for the key-value cache in accordance with the inference request by performing step 214 of assigning a starting virtual memory address in the key-value cache, and performing step 216 of calculating memory pointers for each layer in the generative model and each block so that the blocks are written sequentially. Each block address of the one or more blocks of key-value pairs written to the key-value cache may be calculated using the formula: block address=starting virtual memory address+(block index×block size).

The method 200 further includes performing step 218 of outputting the generated memory pointers to the generative model, thereby causing each self-attention layer of the generative model to write computed key-value pairs at physical addresses in the key-value cache specified by the memory pointers. At step 220 of method 200, responsive to detecting that the inference request is finished, the physical GPU memory associated with the inference request is unmapped in the key-value cache.

Referring to FIG. 5, tables 300 and 400 summarize the results of two experiments conducted by the present inventors to measure the input/output (I/O) throughput performance of an inference process of a generative model before and after implementing the key-value cache manager 114 of the present disclosure. The experiments were conducted by replacing the key-value cache manager or inference engine of a generative model with the key-value cache manager 114 of the present disclosure and measuring the resulting improvements in I/O throughput. Table 300 shows the experimental data collected in a first experiment using first GPU hardware, namely, NVIDIA Tesla P100 GPU hardware. Table 400 shows the experimental data collected in a second experiment using second GPU hardware, namely, NVIDIA A100 Tensor Core GPU hardware.

The first and second experiments were performed on a relatively small vLLM generative model with 32 layers and a dimensionality of 4096 and a relatively large vLLM generative model with 80 layers and a dimensionality of 8192. Each generative model processed input prompts of two different sequence lengths: 4096 and 8192.

The first experiment demonstrated significant throughput improvements on the relatively small generative model, as illustrated in table 300. For the 4096-sequence length, the throughput increased from 6,431 GB/s to 10,833 GB/s by replacing the inference engine with the key-value cache manager of the present disclosure, resulting in a throughput improvement of 68.4% on the P100 GPU hardware. For the 8192-sequence length, the throughput increased from 6,499 GB/s to 10,999 GB/s by replacing the inference engine with the key-value cache manager of the present disclosure, resulting in a throughput improvement of 69.2% on the P100 GPU hardware.

The first experiment also demonstrated significant throughput improvements on the relatively large generative model, as illustrated in table 300. For the 4096-sequence length, the throughput increased from 8,141 GB/s to 10,855 GB/s by replacing the inference engine with the key-value cache manager of the present disclosure, resulting in a throughput improvement of 33.3% on the P100 GPU hardware. For the 8192-sequence length, the throughput increased from 8,128 GB/s to 10,564 GB/s by replacing the inference engine with the key-value cache manager of the present disclosure, resulting in a throughput improvement of 30.0% on the P100 GPU hardware.

The second experiment demonstrated significant throughput improvements on the relatively small generative model, as illustrated in table 400. For the 4096-sequence length, the throughput increased from 8,403 GB/s to 23,706 GB/s by replacing the inference engine with the key-value cache manager of the present disclosure, resulting in a throughput improvement of 182.1% on the A100 Tensor Core GPU hardware. For the 8192-sequence length, the throughput increased from 8,131 GB/s to 23,350 GB/s by replacing the inference engine with the key-value cache manager of the present disclosure, resulting in a throughput improvement of 187.2% on the A100 Tensor Core GPU hardware.

The second experiment also demonstrated significant throughput improvements on the relatively large generative model, as illustrated in table 400. For the 4096-sequence length, the throughput increased from 12,173 GB/s to 22,986 GB/s by replacing the inference engine with the key-value cache manager of the present disclosure, resulting in a throughput improvement of 88.8% on the A100 Tensor Core GPU hardware. For the 8192-sequence length, the throughput increased from 11,737 GB/s to 22,997 GB/s by replacing the inference engine with the key-value cache manager of the present disclosure, resulting in a throughput improvement of 95.9% on the A100 Tensor Core GPU hardware.

These experimental results demonstrate that the above-described computing system and method of the present disclosure significantly improve I/O throughput performance across different GPU hardware, different model sizes, and different input prompt sizes, thereby enabling reduced memory consumption, efficient memory access, reduced memory fragmentation, and reduced waste of GPU memory resources during inference processes of generative models.

In some embodiments, the methods and processes described herein may be tied to a computing system of one or more computing devices. In particular, such methods and processes may be implemented as a computer-application program or service, an Application Program Interface (API), a library, and/or other computer-program product. In some embodiments, the methods and processes described herein may be tied to a computing system of one or more computing devices. In particular, such methods and processes may be implemented as a computer-application program or service, an API, a library, and/or other computer-program product.

Figure 6:
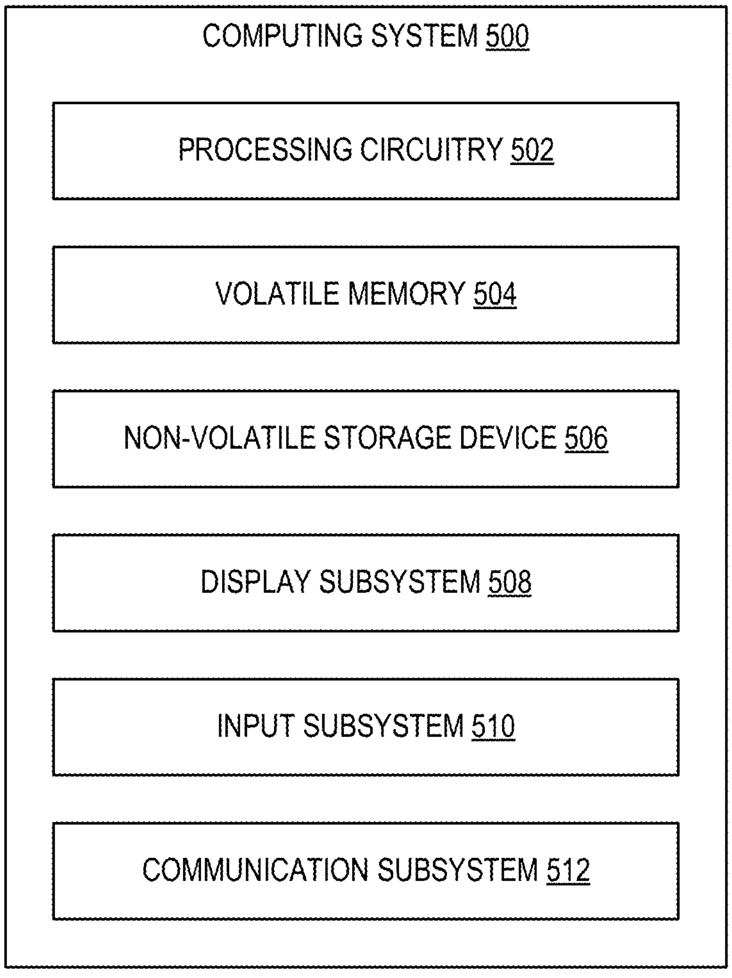
FIG. 6 shows an example computing environment of the present disclosure.

FIG. 6 schematically shows a non-limiting embodiment of a computing system 500 that can enact one or more of the methods and processes described above. Computing system 500 is shown in simplified form. Computing system 500 may embody the computing system 10 described above and illustrated in FIG. 1. Components of computing system 500 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 500 includes processing circuitry 502, volatile memory 504, and a non-volatile storage device 506. Computing system 500 may optionally include a display subsystem 508, input subsystem 510, communication subsystem 512, and/or other components not shown in FIG. 6.

Processing circuitry 502 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 502 may be single-core or multi-core, and the instructions executed thereon may be configured for sequential, parallel, and/or distributed processing. Individual components of the processing circuitry 502 optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 502.

Non-volatile storage device 506 includes one or more physical devices configured to hold instructions executable by the processing circuitry 502 to implement the methods and processes described herein. When such methods and processes are implemented, the state of non-volatile storage device 506 may be transformed—e.g., to hold different data.

Non-volatile storage device 506 may include physical devices that are removable and/or built in. Non-volatile storage device 506 may include optical memory, semiconductor memory, and/or magnetic memory, or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by processing circuitry 502 to temporarily store information during processing of software instructions. It will be appreciated that volatile memory 504 typically does not continue to store instructions when power is cut to the volatile memory 504.

Aspects of processing circuitry 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via processing circuitry 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with processing circuitry 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, camera, or microphone.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 500 to send and/or receive messages to and/or from other devices via a network such as the Internet.

The following paragraphs provide additional support for the claims of the subject application. One aspect provides a key-value cache management system for processing an inference request of a generative model, the management system comprising processing circuitry and memory storing instructions that, when executed, cause the processing circuitry to receive the inference request to write one or more blocks of key-value pairs to a key-value cache, the inference request including a starting virtual memory address and a number of layers in the generative model, reserve contiguous virtual memory space for the key-value cache in accordance with the inference request by assigning the starting virtual memory address in the key-value cache and calculating memory pointers for each layer in the generative model and each block so that the one or more blocks are written sequentially, and output the generated memory pointers to the generative model, thereby causing each self-attention layer of the generative model to write computed key-value pairs at physical addresses in the key-value cache specified by the memory pointers. In this aspect, additionally or alternatively, keys and values of the computed key-value pairs may be stored in a sequential and contiguous manner in contiguous layers and blocks from the starting virtual memory address in the key-value cache. In this aspect, additionally or alternatively, the contiguous layers and blocks may include contiguous heads. In this aspect, additionally or alternatively, each block address of the one or more blocks of key-value pairs written to the key-value cache may be calculated using the formula block address=starting virtual memory address+(block index× block size). In this aspect, additionally or alternatively, the calculation of each block address may not involve a block table which maps virtual blocks to physical blocks. In this aspect, additionally or alternatively, responsive to detecting that the inference request is finished, physical memory associated with the inference request may be unmapped in the key-value cache. In this aspect, additionally or alternatively, the unmapped physical memory may be added to a memory pool for reuse. In this aspect, additionally or alternatively, for a given block of the one or more blocks, each layer may contain keys or values calculated from a sequence of tokens corresponding to the given block. In this aspect, additionally or alternatively, each block in the key-value cache may comprise a key cache configured to store keys of the key-value pairs and a value cache configured to store corresponding values of the key-value pairs. In this aspect, additionally or alternatively, each layer in the key cache and the value cache of a given block may contain keys or values calculated from a sequence of tokens corresponding to the given block.

Another aspect provides a key-value cache management method for processing an inference request of a generative model, the management method comprising receiving the inference request to write one or more blocks of key-value pairs to a key-value cache, the inference request including a starting virtual memory address and a number of layers in the generative model, reserving contiguous virtual memory space for the key-value cache in accordance with the inference request by assigning the starting virtual memory address in the key-value cache and calculating memory pointers for each layer in the generative model and each block so that the one or more blocks are written sequentially, and outputting the generated memory pointers to the generative model, thereby causing each self-attention layer of the generative model to write computed key-value pairs at physical addresses in the key-value cache specified by the memory pointers. In this aspect, additionally or alternatively, keys and values of the computed key-value pairs may be stored in a sequential and contiguous manner in contiguous layers and blocks from the starting virtual memory address in the key-value cache. In this aspect, additionally or alternatively, the contiguous layers and blocks may include contiguous heads. In this aspect, additionally or alternatively, each block address of the one or more blocks of key-value pairs written to the key-value cache may be calculated using the formula block address=starting virtual memory address+(block index×block size). In this aspect, additionally or alternatively, the calculation of each block address may not involve a block table which maps virtual blocks to physical blocks. In this aspect, additionally or alternatively, responsive to detecting that the inference request is finished, physical memory associated with the inference request may be unmapped in the key-value cache. In this aspect, additionally or alternatively, for a given block of the one or more blocks, each layer may contain keys or values calculated from a sequence of tokens corresponding to the given block. In this aspect, additionally or alternatively, each block in the key-value cache comprises a key cache configured to store keys of the key-value pairs and a value cache may be configured to store corresponding values of the key-value pairs. In this aspect, additionally or alternatively, each layer in the key cache and the value cache of a given block may contain keys or values calculated from a sequence of tokens corresponding to the given block.

Another aspect provides a non-transitory computer-readable storage medium storing instructions that, when executed by processing circuitry, cause the processing circuitry to perform a key-value cache management method for processing an inference request of a generative model, the method comprising receiving the inference request to write one or more blocks of key-value pairs to a key-value cache, the inference request including a starting virtual memory address, a token length, and a number of layers in the generative model, reserving contiguous virtual memory space for the key-value cache in accordance with the inference request by assigning the starting virtual memory address in the key-value cache and calculating memory pointers for each layer in the generative model and each block so that the one or more blocks are written sequentially, and outputting the generated memory pointers to the generative model, thereby causing each self-attention layer of the generative model to write computed key-value pairs at physical addresses in the key-value cache specified by the memory pointers.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A key-value cache management system for processing an inference request of a generative model, the management system comprising:
- processing circuitry and memory storing instructions that, when executed, cause the processing circuitry to:
  - receive the inference request to write one or more blocks of key-value pairs to a key-value cache, the inference request including a starting virtual memory address and a number of layers in the generative model;
  - reserve contiguous virtual memory space for the key-value cache in accordance with the inference request such that the one or more blocks of the key-value pairs are reserved as contiguous blocks in the key-value cache, by assigning the starting virtual memory address in the key-value cache and calculating memory pointers for each layer in the generative model and each block so that the one or more blocks of the key-value pairs are written sequentially to the key-value cache, calculating each block address of the one or more blocks of the key-value pairs directly from the starting virtual memory address and a block index using a deterministic offset computation; and
  - output the generated memory pointers to the generative model, thereby causing each self-attention layer of the generative model to write computed key-value pairs at physical addresses in the key-value cache specified by the memory pointers.

2. The management system of claim 1, wherein keys and values of the computed key-value pairs are stored in a sequential and contiguous manner in contiguous layers and blocks from the starting virtual memory address in the key-value cache.

3. The management system of claim 2, wherein the contiguous layers and blocks include contiguous heads.

4. The management system of claim 1, wherein each block address of the one or more blocks of key-value pairs written to the key-value cache is calculated using the formula: block address=starting virtual memory address+(block index×block size).

5. The management system of claim 4, wherein the calculation of each block address does not involve a block table which maps virtual blocks to physical blocks.

6. The management system of claim 1, wherein responsive to detecting that the inference request is finished, physical memory associated with the inference request is unmapped in the key-value cache.

7. The management system of claim 6, wherein the unmapped physical memory is added to a memory pool for reuse.

8. The management system of claim 1, wherein for a given block of the one or more blocks, each layer contains keys or values calculated from a sequence of tokens corresponding to the given block.

9. The management system of claim 1, wherein each block in the key-value cache comprises a key cache configured to store keys of the key-value pairs and a value cache configured to store corresponding values of the key-value pairs.

10. The management system of claim 9, wherein each layer in the key cache and the value cache of a given block contains keys or values calculated from a sequence of tokens corresponding to the given block.

11. A key-value cache management method for processing an inference request of a generative model, the management method comprising:

receiving the inference request to write one or more blocks of key-value pairs to a key-value cache, the inference request including a starting virtual memory address and a number of layers in the generative model;

reserving contiguous virtual memory space for the key-value cache in accordance with the inference request such that the one or more blocks of the key-value pairs are reserved as contiguous blocks in the key-value cache, by assigning the starting virtual memory address in the key-value cache and calculating memory pointers for each layer in the generative model and each block so that the one or more blocks of the key-value pairs are written sequentially to the key-value cache, calculating each block address of the one or more blocks of the key-value pairs directly from the starting virtual memory address and a block index using a deterministic offset computation; and outputting the generated memory pointers to the generative model, thereby causing each self-attention layer of the generative model to write computed key-value pairs at physical addresses in the key-value cache specified by the memory pointers.

12. The management method of claim 11, wherein keys and values of the computed key-value pairs are stored in a sequential and contiguous manner in contiguous layers and blocks from the starting virtual memory address in the key-value cache.

13. The management method of claim 12, wherein the contiguous layers and blocks include contiguous heads.

14. The management method of claim 11, wherein each block address of the one or more blocks of key-value pairs written to the key-value cache is calculated using the formula: block address=starting virtual memory address+(block index×block size).

15. The management method of claim 14, wherein the calculation of each block address does not involve a block table which maps virtual blocks to physical blocks.

16. The management method of claim 11, wherein responsive to detecting that the inference request is finished, physical memory associated with the inference request is unmapped in the key-value cache.

17. The management method of claim 11, wherein for a given block of the one or more blocks, each layer contains keys or values calculated from a sequence of tokens corresponding to the given block.

18. The management method of claim 11, wherein each block in the key-value cache comprises a key cache configured to store keys of the key-value pairs and a value cache configured to store corresponding values of the key-value pairs.

19. The management method of claim 18, wherein each layer in the key cache and the value cache of a given block contains keys or values calculated from a sequence of tokens corresponding to the given block.

20. A non-transitory computer-readable storage medium storing instructions that, when executed by processing circuitry, cause the processing circuitry to perform a key-value cache management method for processing an inference request of a generative model, the method comprising:

receiving the inference request to write one or more blocks of key-value pairs to a key-value cache, the inference request including a starting virtual memory address, a token length, and a number of layers in the generative model;

reserving contiguous virtual memory space for the key-value cache in accordance with the inference request such that the one or more blocks of the key-value pairs are reserved as contiguous blocks in the key-value cache, by assigning the starting virtual memory address in the key-value cache and calculating memory pointers for each layer in the generative model and each block so that the one or more blocks of the key-value pairs are written sequentially to the key-value cache, calculating each block address of the one or more blocks of the key-value pairs directly from the starting virtual memory address and a block index using a deterministic offset computation; and outputting the generated memory pointers to the generative model, thereby causing each self-attention layer of the generative model to write computed key-value pairs at physical addresses in the key-value cache specified by the memory pointers.

* * * * *